(12) United States Patent
Moser

(10) Patent No.: US 10,422,632 B2
(45) Date of Patent: Sep. 24, 2019

(54) DEVICE AND METHOD FOR DISTANCE MEASUREMENT FOR A LASER PROCESSING SYSTEM, AND A LASER PROCESSING SYSTEM

(71) Applicant: Precitec GmbH & Co. KG, Gaggenau (DE)

(72) Inventor: Rüdiger Moser, Malsch (DE)

(73) Assignee: Precitec GmbH & Co. KG, Gaggenau (DE)

( * ) Notice: Subject to any disclaimer, the term of this patent is extended or adjusted under 35 U.S.C. 154(b) by 0 days.

(21) Appl. No.: 16/015,571

(22) Filed: Jun. 22, 2018

(65) Prior Publication Data

US 2018/0372483 A1 Dec. 27, 2018

(30) Foreign Application Priority Data

Jun. 23, 2017 (DE) .................. 10 2017 114 033

(51) Int. Cl.
*G01B 9/02* (2006.01)
*G01B 11/22* (2006.01)
*G01B 5/00* (2006.01)
*G01B 11/24* (2006.01)
*G02B 26/08* (2006.01)
(Continued)

(52) U.S. Cl.
CPC ............ *G01B 11/22* (2013.01); *B23K 26/048* (2013.01); *B23K 26/21* (2015.10); *B23K 26/24* (2013.01); *B23K 26/705* (2015.10); *G01B 5/0037* (2013.01); *G01B 9/02091* (2013.01); *G01B 11/2441* (2013.01); *G02B 26/0875* (2013.01)

(58) Field of Classification Search
CPC ............ G01B 11/2441; G01B 9/02091; G01B 9/02015; G01B 9/02049; G01B 9/0205; G01B 9/02055; G01B 9/02058
See application file for complete search history.

(56) References Cited

U.S. PATENT DOCUMENTS

2005/0259306 A1 11/2005 Broome et al.
2013/0148925 A1 6/2013 Muendel et al.
(Continued)

FOREIGN PATENT DOCUMENTS

DE 10 2013 225 108 A1 6/2015
DE 10 2014 113 283 B4 11/2016
(Continued)

OTHER PUBLICATIONS

PCT Second Written Opinion, PCT Application No. PCT/EP2018/066658, dated May 21, 2019, eight pages (with concise explanation of relevance).
(Continued)

*Primary Examiner* — Jonathan M Hansen
(74) *Attorney, Agent, or Firm* — Fenwick & West LLP

(57) ABSTRACT

The present disclosure relates to a device for distance measurement for a laser processing system, comprising a collimator lens system, which is set up to collimate an optical measuring beam, a deflection lens system, which defines an optical axis, wherein the deflection lens system comprises at least one transmissive optical element, which is displaceable relative to the optical axis, in order to deflect the collimated optical beam from the optical axis, and a focusing lens system, which is set up to focus the deflected measuring beam onto a workpiece.

16 Claims, 5 Drawing Sheets

(51) Int. Cl.
    *B23K 26/70*    (2014.01)
    *B23K 26/24*    (2014.01)
    *B23K 26/04*    (2014.01)
    *B23K 26/21*    (2014.01)

(56) References Cited

U.S. PATENT DOCUMENTS

| | | |
|---|---|---|
| 2015/0283613 A1 | 10/2015 | Backlund et al. |
| 2015/0338210 A1* | 11/2015 | Lessmuller ......... B23K 26/032 250/492.1 |
| 2016/0039045 A1 | 2/2016 | Webster |
| 2016/0059350 A1* | 3/2016 | Schoenleber ...... B23K 26/0892 219/121.81 |
| 2016/0202045 A1 | 7/2016 | Schönleber et al. |
| 2016/0356595 A1* | 12/2016 | Lessmueller ...... G01B 9/02091 |

FOREIGN PATENT DOCUMENTS

| | | |
|---|---|---|
| DE | 10 2015 007 142 A1 | 12/2016 |
| DE | 10 2016 109 909 A1 | 11/2017 |
| EP | 0 821 259 A2 | 1/1998 |
| EP | 1 977 850 A1 | 10/2008 |
| WO | WO 2016/062636 A1 | 4/2016 |

OTHER PUBLICATIONS

PCT International Search Report, PCT Application No. PCT/EP2018/066658, dated Aug. 20, 2018, two pages.

* cited by examiner

DEVICE AND METHOD FOR DISTANCE MEASUREMENT FOR A LASER PROCESSING SYSTEM, AND A LASER PROCESSING SYSTEM

CROSS-REFERENCE TO RELATED APPLICATION

This application claims priority under 35 U.S.C. § 119(a) to German Patent Application No. 10 2017 114 033.6 filed on Jun. 23, 2017, which is incorporated by reference herein in its entirety.

BACKGROUND

The present disclosure relates to a device and a method for distance measurement for a laser processing system, and relates to a laser processing system. The present disclosure relates in particular to a laser welding head with an optical coherence tomograph.

In a laser deep-welding process, a vapour capillary arises during a welding process along the beam axis of the processing beam, which vapour capillary is also called a "keyhole" and is surrounded by liquid melt. The depth of the vapour capillary is related to the depth of the weld seam or welding penetration depth. The welding penetration depth is an important parameter, since a depth that is too small can lead to a lack of strength of the weld joint. In contrast with this, a depth that is too great can give rise to full-penetration welding, as a result of which the weld seam is visible on the rear side.

A measuring beam can be used to determine the depth of the vapour capillary or the welding penetration depth, which measuring beam is directed into the vapour capillary. Both the size and diameter of the measuring beam on the workpiece surface and also the lateral incident position are decisive for an error-free measurement of the depth of the vapour capillary or the welding penetration depth. The incident position of the measuring beam can be adjusted by deflecting the measuring beam. Since the measuring beam no longer runs on the optical axis when the beam is deflected, the measuring beam experiences image defects (aberrations), which enlarge the diameter of the measuring beam in the region of the focus. The measurement of the depth of the vapour capillary or the welding penetration depth may thus be inaccurate or bound up with errors.

Use may be made of mirror optics (e.g. galvo-scanners) for the seam deflection, such as are described in publications US 2016/0039045 A1, DE 10 2013 225 108 A1, EP 1 977 850 B1 and DE 10 2014 113 283 B4. Mirrors have two disadvantages for the positioning of the measuring beam onto the vapour capillary. On the one hand, small angular changes of the mirror cause large positional changes of the measuring beam on account of the reflection law. On the other hand, a plane mirror does not influence the measuring beam, apart from directional changes. In other words, aberrations which arise for example in the focusing lens system with a non-axial passage of the measuring beam cannot be compensated for by the plane mirror. When use is made of galvo-scanners, F-Theta lenses can be used as a focusing lens system, which ensure that the measuring beam always retains the same diameter independently of the deflection. However, these lenses are expensive and are usually optimised only for one wavelength. The high-energy processing beam and the measuring beam, however, often have different wavelengths.

Furthermore, a device for measuring the depth of a welding seam in real time during the welding or jointing of a workpiece by means of radiation is known from WO 2016/062636 A1. For the lateral adjustment of the focal position of the measuring light beam, the exit/entry face of the optical waveguide can be displaced with respect to the collimator lens transversely to its optical axis. Drives with a high degree of precision are required for this.

SUMMARY

It is the problem of the present disclosure to provide a device and a method for distance measurement for a laser processing system as well as a laser processing system, which permit a distance measurement, such as for example a depth measurement of the vapour capillary, a topography measurement of a joint geometry or an upper seam bead or suchlike with a high degree of precision.

The problem is solved by the subject-matter of the independent claims. Advantageous embodiments of the invention are specified in the sub-claims.

According to embodiments of the present disclosure, a device for distance measurement for a laser processing system is specified. The device comprises a collimator lens system, which defines an optical axis and is set up to collimate an optical beam, a deflection lens system, wherein the deflection lens system comprises at least one transmissive optical element, which is displaceable relative to the optical axis in order to deflect the collimated optical beam from the optical axis. The device can also comprise a focusing lens system, which is set up to focus the deflected optical beam onto a workpiece. The optical beam can be an optical measuring beam. Alternatively, the optical beam can be a processing beam, wherein a measuring beam is additionally focused along the optical axis onto the workpiece. For example, the device according to the invention for distance measurement for a laser processing system can comprise: a collimator lens system, which defines an optical axis (201) and is set up to collimate an optical measuring beam; and a deflection lens system, wherein the deflection lens system comprises at least one transmissive optical element, which is displaceable relative to the optical axis, in order to deflect the collimated optical measuring beam from the optical axis; wherein the deflection lens system is arranged in the beam path in front of a focusing lens system, which is set up to focus the deflected optical measuring beam onto a workpiece. Alternatively, a device according to the invention for distance measurement for a laser processing system can comprise: a collimator lens system, which defines an optical axis and is set up to collimate a processing beam; and a deflection lens system, wherein the deflection lens system comprises at least one transmissive optical element, which is displaceable relative to the optical axis, so as to deflect the collimated processing beam from the optical axis; wherein the deflection lens system is arranged in the beam path in front of a focusing lens system, which is set up to focus the deflected processing beam onto a workpiece. The deflection lens system can be arranged in the beam path in front of the focusing lens system for focusing the deflected optical measuring beam onto the workpiece. The focusing lens system can be part of the device, or part of the laser processing system.

The at least one displaceable transmissive optical element can be displaced essentially transversely or perpendicular to the optical axis. The deflection lens system can also comprise at least one fixed transmissive optical element. The at least one transmissive optical element can comprise or be a plane-concave lens and/or a plane-convex lens and/or an aspherical or spherical lens. The at least one transmissive optical element can comprise a first transmissive optical element and a second transmissive optical element. Here, the first transmissive optical element can be arranged in the beam path in front of the second transmissive element. The first transmissive optical element can be a plane-concave lens and the second transmissive optical element can be a plane-convex lens. Alternatively, the first transmissive optical element can be a plane-convex lens, and the second transmissive optical element a plane-concave lens. The plane-concave lens can have a first radius and the plane-convex lens a second radius, wherein the first radius and the second radius are essentially identical. The first radius and/or the second radius can lie in the range from 20 to 2000 mm, in particular the first radius and/or the second radius can be approximately 200 mm. The transmissive optical elements can either be made from the same optical material, or from different optical materials.

The first transmissive optical element and the second transmissive optical element can be displaceable with respect to one another. The first or the second transmissive optical element can be displaceable relative to the optical axis. The other of the first and second transmissive optical elements can be essentially fixed relative to the optical axis. Both the first transmissive optical element and also the second transmissive optical element can however also be displaceable relative to the optical axis.

The deflection lens system or the at least one transmissive optical element can be set up to compensate for aberrations of the optical measuring beam on the workpiece. In particular, the deflection lens system or the at least one transmissive optical element can be set up to compensate for an aberration of a focusing lens system.

The device can comprise a coherence interferometer.

According to further embodiments of the present disclosure, a laser processing system is specified. The laser processing system comprises a laser device for generating a processing beam, wherein the laser device is set up to direct the processing beam onto a processing region of a workpiece, and the device for distance measurement according to the embodiments described here. The laser device can comprise a collimator lens system for collimating the processing beam and/or a focusing lens system for focusing the processing beam onto the workpiece. The focusing lens system can also be set up to focus the deflected measuring beam onto the workpiece. The optical axis of the device for the distance measurement or of the deflection lens system can coincide with an optical axis of the laser device.

The processing beam and the optical measuring beam can be coaxial at least in some sections. In particular, the processing beam and the optical measuring beam can be superimposed coaxially at least in some sections.

The device can be set up to provide the optical measuring beam, with respect to a processing direction or advancing direction of the processing beam on the workpiece, in front of the processing beam, i.e. on a region of the workpiece yet to be processed, after the processing beam, i.e. on a region of the workpiece already processed, or at the site of the processing beam.

According to other embodiments, a method is specified for the distance measurement for a laser processing system. The method comprises a collimation of the optical measuring beam, a deflection of the collimated optical measuring beam by displacement of at least one transmissive optical element, and focusing of the deflected optical measuring beam onto a workpiece.

The method can further comprise: a determination of a depth or a depth profile of a vapour capillary on the workpiece and/or a topography of the workpiece using the measuring beam reflected from the workpiece.

Preferred, optional embodiments and particular aspects of the disclosure emerge from the dependent claims, the drawings and the present description.

According to the invention, at least one transmissive optical element is inserted into the collimated beam path of the optical measuring beam, said transmissive optical element permitting the collimated optical measuring beam to be deflected from its optical axis and the aberrations, which arise for example at the focusing lens system, to be compensated for at the same time. The divergence of the optical measuring beam is not thereby influenced or is so only slightly. The optical measuring beam thus runs collimated also after the transmissive optical element for the beam deflection. The measuring beam, which runs through the focusing lens system of the high-energy processing beam, can thus be deflected laterally, without aberrations thereby arising in the region of the workpiece surface. In addition, the precision or the positional accuracy with which the beam can be deflected can be increased. A distance measurement, such as for example a depth measurement of the vapour capillary, can take place with a high degree of precision.

BRIEF DESCRIPTION OF THE DRAWINGS

Examples of embodiment of the disclosure are represented in the figures and will be described in greater detail below. In the figures.

DETAILED DESCRIPTION OF EMBODIMENTS

Identical reference numbers will be used for identical or identically acting elements in the following, unless indicated otherwise.

Figure 1:
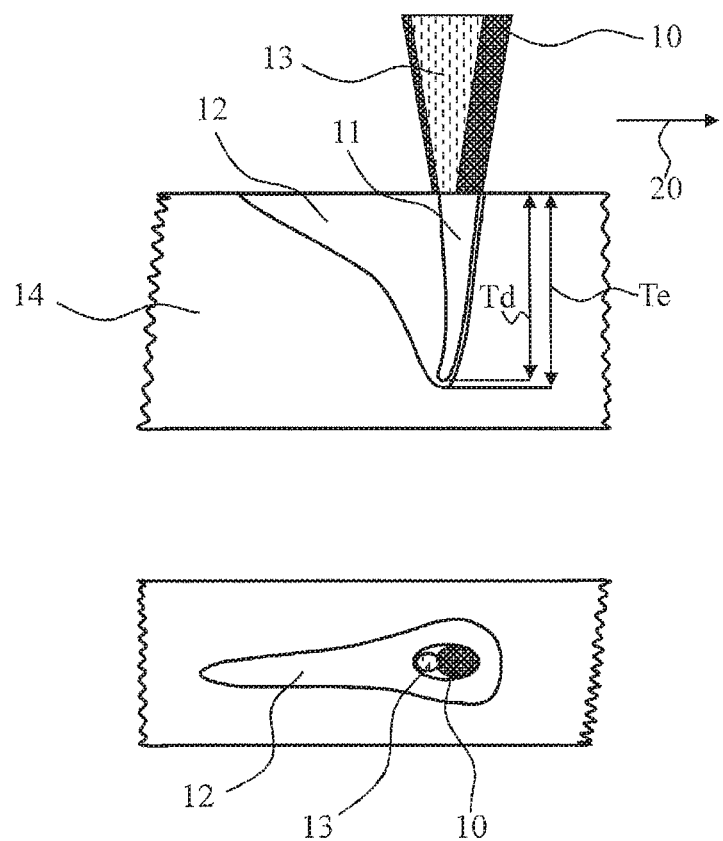
FIG. 1 shows a diagrammatic cross-sectional view of a workpiece (top) and a plan view of the workpiece (bottom) to represent a vapour capillary and a measuring beam during welding according to embodiments of the present disclosure.

FIG. 1 shows a diagrammatic cross-sectional view of a workpiece (top) and a plan view of the workpiece (bottom) to represent a vapour capillary and a measuring beam during welding according to embodiments of the present disclosure.

As represented in FIG. 1, a vapour capillary 11 arises along the beam axis of processing beam 10 in the laser deep-welding process during a welding operation, which vapour capillary is also referred to as a keyhole, and which is surrounded by liquid melt 12. Depth Td of the vapour capillary, also referred to below as the keyhole depth, is related to the weld seam depth or welding penetration depth Te. Viewed in the advancing direction, solidified melt 14 is present behind liquid melt 12.

In order to determine the welding penetration depth or the depth of vapour capillary 11, for example during the welding process, measuring beam 13 of an optical coherence tomograph can be superimposed coaxially with processing beam 10 and focused in the opening of vapour capillary 11. The incident light strikes the bottom or the end of vapour capillary 11, is partially reflected there and arrives back in the optical coherence tomograph, with the aid of which depth Td of vapour capillary 11 can be measured with a high degree of precision.

On account of the sharply tapering shape of vapour capillary 11, measuring beam 13 (the measuring light) is only very poorly reflected at its lower end. Furthermore, the opening of vapour capillary 11 has a small diameter, into which measuring beam 13 has to be focused. Typical focusing diameters of a high-energy processing beam 10 lie in the range from 100 to 1000 µm. The opening diameter of vapour capillary 11 may have a smaller diameter. It is therefore desirable to focus measuring beam 13 on a diameter which is smaller than the opening of vapour capillary 11 and also to align it laterally in such a way that it passes completely into the opening of vapour capillary 11 and can propagate to the bottom or end thereof.

On account of the elliptical opening and the curved shape of vapour capillary 11, measuring beam 13 can be positioned subsequently in the case of higher advancing speeds. If the lateral incident position of measuring beam 13 is not ideal, only a few data are detected from the bottom of vapour capillary 11. Instead, distance information is delivered from a position located higher up at the side wall of vapour capillary 11 or even from the surface of the workpiece. The determination of depth Td of vapour capillary 11 is thus made difficult or is no longer possible. For this reason, both the size of measuring beam 13 at the workpiece surface and also the lateral incident position are crucial for an error-free and precise measurement of depth Td of vapour capillary 11.

In order to find the ideal incident position of measuring beam 13, measuring beam 13 can be displaced laterally in its position in a region around the incident position of high-energy processing beam 10 during a processing operation. The displacement of measuring beam 13 takes place by means of deflection elements in the beam path of measuring beam 13. The deflection of measuring beam 13 can take place before the coaxial superimposition of measuring beam 13 and processing beam 10, in order that high-energy processing beam 10 remains unaffected by the deflection. In other words, a relative movement between processing beam 10 and measuring beam 13 should take place. In order that the lateral position of measuring beam 13 changes in the processing plane, measuring beam 13 is deflected from its optical axis before striking the focusing lens system. Measuring beam 13 and the optical axis then assume an angle of greater than 0°. Alternatively, the relative movement between processing beam 10 and measuring beam 13 can also be achieved by a deflection of processing beam 10. For this purpose, deflection lens system 220 can be arranged in the beam path of collimated processing beam 10 in front of focusing lens system 130.

For the deflection of an optical beam from its optical axis, elements can for example be displaced in the collimation unit, such as for example the end of the light guide, transversely to the optical axis (see WO 2016/062636 A1). Alternatively, the collimating lens or a further lens can be displaced in the divergent beam path transversely to the optical axis. Furthermore, deflecting elements can be integrated into the beam path after the collimation unit, such as for example deflection mirrors (galvo-scanners) fastened to galvanometer motors, in order to change the deflection angle.

In order to find the ideal incident position of the measuring beam on the workpiece surface and then to be able to maintain the latter also over a long period, a precise system is required for the deflection. The positional accuracy, the reproducibility, but also the positional drift play a decisive role here. Since the measuring beam no longer runs on the optical axis when the beam is deflected, the measuring beam experiences image defects (aberrations), which increase the diameter of the measuring beam in the region of the focus. Some of these defects, in particular with monochromatic light, are: astigmatism, coma, field curvature, distortion. On account of the coaxial superimposition of measuring beam and processing beam, a common focusing lens system (also referred to as a "focus lens") can be used for the focusing. This lens system is generally not designed for beams which lead away from the optical axis. The reasons for this are:

An optical coherence tomograph is subsequently installed on an existing processing head. The high-energy processing beam generally runs axially, so that no aberrations occur due to obliquely incident beams and the optical system is not designed for this.

The focusing lens system is subjected to the high-energy processing beam and must meet high demands on cleanliness and material quality. For reasons of cost, it is advantageous to keep this lens system as simple as possible.

The measuring beam of the coherence tomograph, depending on the desired incident position on the workpiece, will thus run obliquely through the focusing lens system, as a result of which aberrations arise. The effect of this is that the diameter of the measuring beam on the component surface becomes greater with an increasing deflection on account of the aberrations. If the ideal position for the depth measurement does not lie on the optical axis, the measuring beam may perhaps no longer be able to be focused completely into the vapour capillary (see top of FIG. 4).

In order to avoid the aforementioned drawbacks, at least one displaceable transmissive optical element is inserted, according to the invention, into the collimated beam path of optical measuring beam 13, which makes it possible to deflect the collimated optical measuring beam from its optical axis and at the same time to compensate for the aberrations which can arise for example at the focusing lens system. The divergence of optical measuring beam 13 is not thereby influenced or only slightly so. Optical measuring beam 13 thus also runs essentially collimated after the optical elements for the beam deflection. The size of measuring beam 13 on the workpiece surface and the lateral incident position can be adjusted precisely, as a result of which an error-free and precise measurement of depth Td of vapour capillary 11 is possible.

Figure 2:
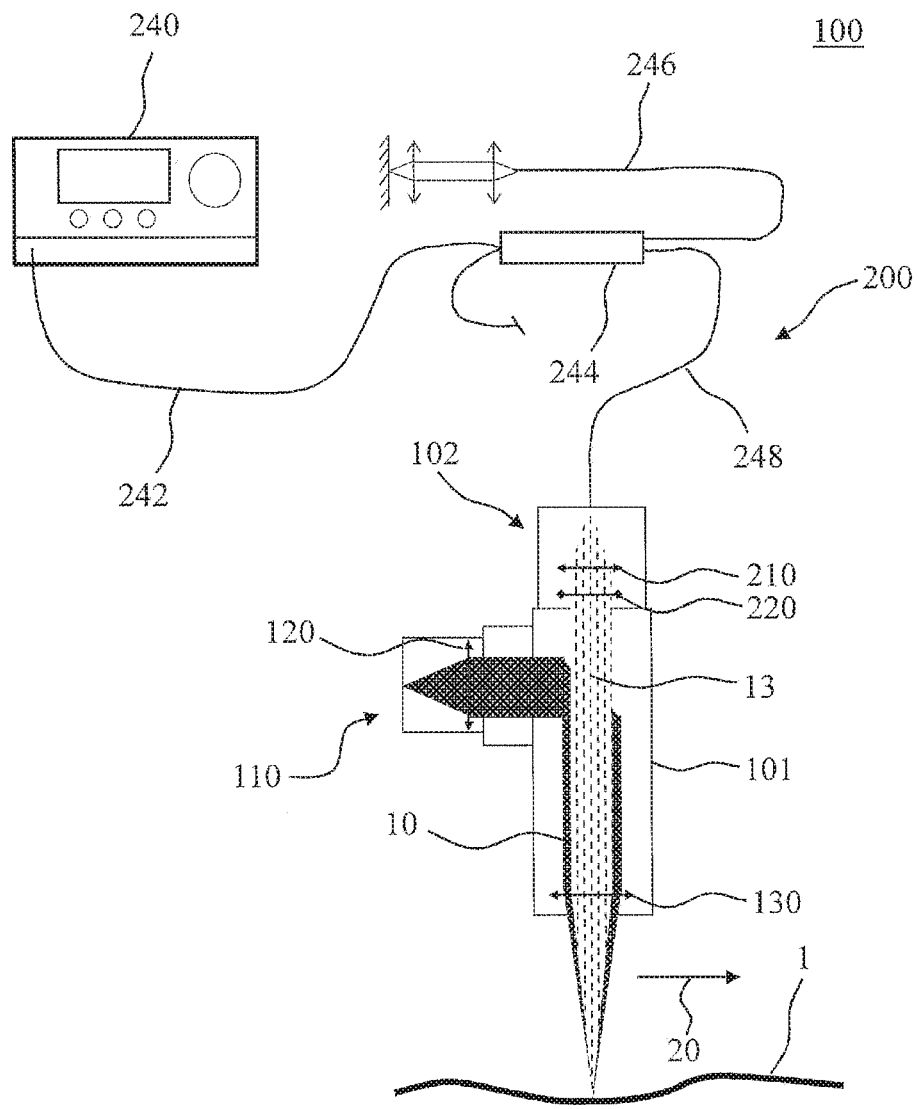
FIG. 2 shows a diagrammatic representation of a laser processing system according to embodiments of the present disclosure.

FIG. 2 shows a diagrammatic representation of a laser processing system 100 according to embodiments of the present disclosure. Laser processing system 100 can comprise a laser welding head 101, and in particular a laser welding head for laser deep-welding.

Laser processing system 100 comprises a laser device 110 for generating a processing beam 10 (also referred to as a "laser beam" or "processing laser beam") and device 200 for the distance measurement according to the embodiments described here. Laser device 110 is set up to direct processing beam 10 onto a processing region of a workpiece 1. Laser device 110 can comprise a collimator lens 120 for collimating processing beam 10 and a focusing lens system 130 for focusing processing beam 10 on workpiece 1.

Device 200 for the distance measurement comprises a collimator lens system 210, which is set up to collimate an optical measuring beam 13, and a deflection lens system 220, wherein deflection lens system 220 comprises at least one transmissive optical element, which is displaceable relative to the optical axis, in order to deflect collimated optical measuring beam 13 from the optical axis. The optical axis is defined here by a light-conducting fibre for optical measuring beam 13 or by collimator lens system 210. For the focusing of deflected optical measuring beam 13 on workpiece 1, focusing lens system 130 of laser device 10 can be used. Device 200 for the distance measurement can however also comprise an additional focusing lens system 230 (see FIG. 3). According to embodiments, device 200 can comprise a coherence interferometer or on optical coherence tomograph or can be a coherence interferometer or optical coherence tomograph.

A method for the distance measurement for a laser processing system according to the embodiments described here can comprise a collimation of an optical measuring beam, a deflection of the collimated optical measuring beam by displacing at least one transmissive optical element, and focusing of the deflected optical measuring beam onto a workpiece. The method can be implemented by the device disclosed here for the distance measurement.

In some embodiments, processing beam 10 and optical measuring beam 13 can be coaxially at least in some sections, and can in particular be superimposed coaxially at least in some sections. For example, device 200 can be set up to couple optical measuring beam 13 into a beam path of laser device 110. The combining of optical measuring beam 13 and processing beam 10 can take place after deflection lens system 220 and in front of focusing lens system 130.

In typical embodiments, which can be combined with other embodiments described here, collimator lens system 210, deflection lens system 220 and focusing lens system 130 or 230 are integrated into welding head 101. For example, welding head 101 can comprise a collimator module 102, which is integrated into welding head 101 or is mounted on welding head 101. Collimator module 102 can comprise collimator lens system 210 and deflection lens system 220. Focusing lens system 130 can be a common focusing lens system, such as for example a focusing lens, for processing beam 10 and measuring beam 13.

Laser processing system 100 or parts thereof, such as for example welding head 101, can be movable along a processing direction 20 according to embodiments. Processing direction 20 can be a welding direction and/or a movement direction of laser processing system 100, such as for example of welding head 101, relative to workpiece 1. Processing direction 20 can in particular be a horizontal direction. Processing direction 20 can also be referred to as the "advancing direction".

In typical embodiments, the determination or measurement of the depth of the vapour capillary in real time is based on the principle of optical coherence tomography, which makes use of the coherence properties of light with the aid of an interferometer. In particular, device 200 can comprise a coherence interferometer or an optical coherence tomograph. As shown in FIG. 2, device 200 can comprise an evaluation unit 240 with a broadband light source (e.g. a super-luminescence diode, SLD), which couples the measuring light into a light waveguide 242. In a beam splitter 244, which preferably comprises a fibre coupler, the measuring light is split into a reference arm 246 and a measurement arm, which leads via a light waveguide 248 into welding head 101.

Collimator lens system 210 (also referred to as a "collimator module") is used to collimate the measuring light (optical measuring beam 13) exiting from light waveguide 248. According to some embodiments, optical measuring beam 13 can be superimposed coaxially with processing beam 10 in welding head 101. Processing laser beam 10 and optical measuring beam 13 can then be focused on workpiece 1 by focusing lens system 130, which can be a common lens or focusing lens. The incident position of optical measuring beam 13 can be adjusted by deflection lens system 220 in such a way that the measuring light is directed into the vapour capillary. The measuring light reflected back out of the vapour capillary is projected by focusing lens system 130 onto the exit/entrance face of light waveguide 248, superimposed in fibre coupler 244 with the light reflected back from reference arm 246 and then directed back into evaluation unit 240. The superimposed light contains information concerning the wavelength difference between reference arm 246 and the measurement arm. This information is evaluated in evaluation unit 240, as a result of which the user obtains information about the distance between the bottom of the vapour capillary and for example welding head 101.

According to embodiments, device 200 can be set up to measure, by means of optical measuring beam 10, a distance to workpiece 1 relative, for example, to a reference point defined by device 200. In particular, device 200 can be set up to measure a change in distance while welding head 101 moves along processing direction 20. A depth profile of the vapour capillary, for example, can thus be prepared. As an alternative or in addition to the measurement of the depth of the vapour capillary, a topography measurement of workpiece 1, for example of the weld seam, can take place. According to some embodiments, the topography measurement can be used for the error detection and/or control of one or more process input variables. The process input variables can comprise for example a processing speed, a laser power, a laser focus, and/or operating parameters of the laser device.

In some embodiments, a topography measurement can be carried out in the region around the processing position. For this purpose, optical measuring beam 13 can be displaced laterally and at the same time height information can be recorded. A height profile thus ensues. Interesting height profiles in laser processing can for example be topographies in the approach perpendicular to the advancing direction, in order for example to detect a joint geometry that is to be welded. Furthermore, a topography running perpendicular to the advancing direction can be measured subsequently, in order to acquire the height profile of the seam upper bead arising in the welding process.

The size of optical measuring beam 13 on the component surface determines the lateral resolution in the topography measurement. If optical measuring beam 13 experiences aberrations due to the deflection, the lateral resolution on the one hand diminishes, on the other hand the measuring spot size and therefore the resolution in a scan through the optical axis does not remain constant. This can be prevented by deflection lens system 220 according to the invention.

Device 200 according to the invention is an optical distance measuring device for a laser processing system for performing distance measurements for example before, during and after the laser processing. The laser processing takes place by means of the processing beam, which can be a high-energy processing beam. The measurement system, which can be constituted as an optical coherence tomograph, is connected to the processing system and/or at least partially integrated into the processing system. The optical measuring beam, which can be a low-energy measuring beam, can be fed via a light guide to the processing head, collimated and then superimposed coaxially with the high-energy processing beam and focused by a common focusing lens system onto the workpiece to be processed. Device 200 contains one or more displaceable transmissive optical elements, with the aid of which the lateral incident position of the measuring beam on workpiece 1 can be displaced in the region around the high-energy processing beam. This permits a distance measurement, such as for example a depth measurement of the vapour capillary, with a high degree of precision.

Figure 3:
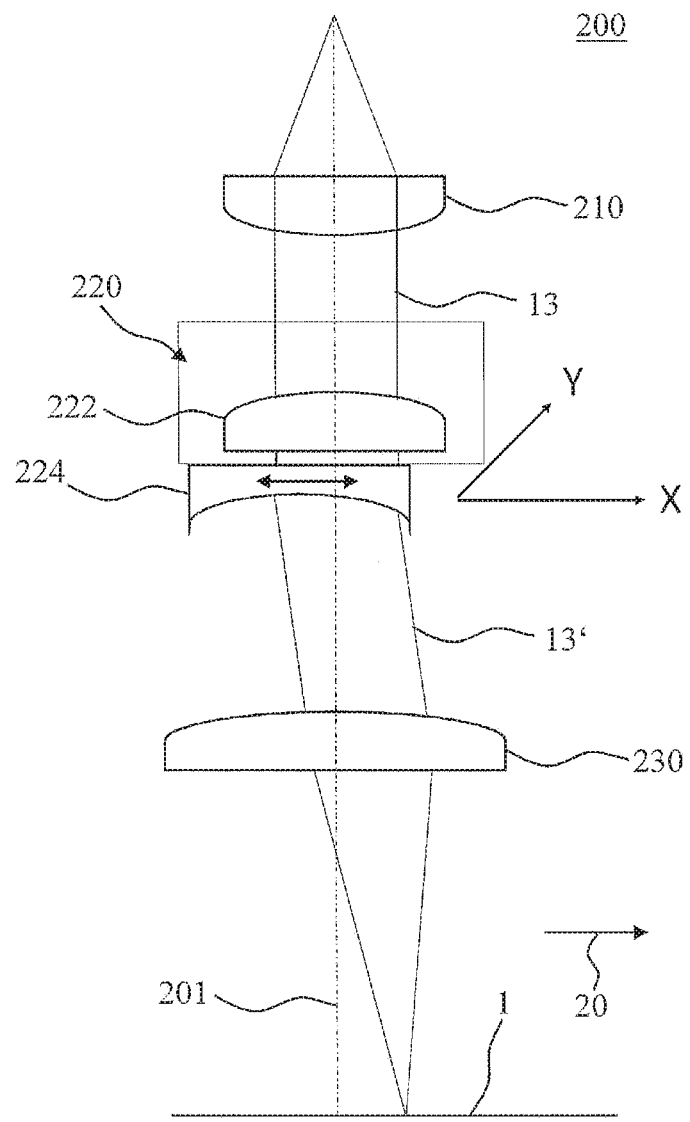
FIG. 3 shows a diagrammatic representation of a device for distance measurement for a laser processing system according to embodiments of the present disclosure.

FIG. 3 shows a diagrammatic representation of a device 200 for the distance measurement for a laser processing system according to embodiments of the present disclosure.

In the case of welding optics, spherical or aspherical focusing lenses are often used. If the measuring light does not fall perpendicularly, but at an angle to the focusing lens, aberrations occur. The dominant defect which contributes significantly to the enlargement of the measuring spot in the processing plane is the coma aberration. Here, the obliquely incident beams are not all uniformly refracted, for which reason they do not unite again in a point in the focal plane. Instead, a point with a tail, which is directed towards the edge, i.e. away from the optical axis, arises.

Deflection lens system 220 with the at least one transmissive optical element is inserted into the beam path of collimated optical measuring beam 13. Deflection lens system 220 can be set up to compensate for aberrations of optical measuring beam 13 on workpiece 1. In particular, deflection lens system 220 can be set up to compensate for an aberration of focusing lens system 230. The divergence of optical measuring beam 13 is not thereby affected or only slightly so. Optical measuring beam 13 thus runs almost collimated also after the at least one transmissive optical element for the beam deflection.

Since transmissive elements are involved in the system for the beam deflection and aberration compensation, the entire optical measuring beam, from the exit from the light guide up to striking the workpiece or component, can run in one axis. The whole system thus becomes more compact. Conventional galvanometer-scanners deflect the measuring beam at each mirror, so that the set-up occupies more volume. As a result of the linear movement of a displacement, instead of tilting, rotation or suchlike, additional space can be saved along the optical axis.

According to embodiments, which can be combined with other embodiments described here, the at least one transmissive optical element is a plane-concave lens (diverging lens) or a plane-convex lens (converging lens). Such lenses have a simple design and can be produced cost-effectively.

In some embodiments, the at least one transitive optical element comprises a first transmissive optical element 222 and a second transmissive 224. For example, first transmissive optical element 222 can be a plane-convex lens and second transmissive optical element 224 can be a plane-concave lens, as is represented in the example of FIG. 3. In other embodiments, the first transmissive optical element can be a plane-concave lens and the second transmissive optical element a plane-convex lens. In particular, the sequence of the lenses in the beam path of the measuring beam can be arbitrary.

According to embodiments, the flat (plane) surfaces of the plane-concave lens and of the plane-convex lens are facing one another. In other words, the curved surfaces, i.e. the concave-curved surface of the plane-concave lens and the convex-curved surface of the plane-convex lens, are located on sides of the lenses facing away from one another.

The plane-concave lens can have a first radius and the plane-convex lens can have a second radius. The first radius and the second radius can be essentially the same. The present disclosure, however, is not limited to this, and the first radius and the second radius can be different in some embodiments. For example, the first radius and/or the second radius can be in the range from 20 to 2000 mm. The first radius and/or the second radius are typically approximately 200 mm. The radii of the two lenses can be identical or almost identical, but have an inverse sign (converging lens and diverging lens). If the focal lengths are large enough, their effects mutually cancel one another out.

The lens radius of the plane-concave and plane-convex lens influences the extent to which aberrations are compensated for. Furthermore, the radius influences the extent to which the collimated optical measuring beam is deflected with a given deflection of the lens. By means of the lens radius, therefore, the "transformation ratio" between the mechanical deflection of the lens and the beam deflection on the workpiece surface can also be influenced. The beam deflection and therefore also the precision and reproducibility can thus be adapted to the given circumstances. Compared to other deflection options, such as moved mirrors or displacement of the end of the fibre, the device according to the invention has a much smaller adjustment sensitivity, as a result of which the precision for the alignment onto the ideal position for measuring the depth of the vapour capillary is significantly improved. Cost-effective drives with a lower precision for the lateral displacement of, for example, the plane concave lens can thus be used, without the required positional accuracy of the optical measuring beam being lost.

At least one transmissive optical element of deflection lens system 220 is displaceable relative to optical axis 201, in order to deflect collimated optical measuring beam 13 from optical axis 201. For example, the transmissive optical element can be displaceable laterally and/or essentially perpendicular to optical axis 201. The term "displaceable" means a translation or displacement of the transmissive optical element, in contrast with a rotation or tilting. Device 200 typically comprises at least one actuator (not shown), which is set up to displace the at least one optical element relative to optical axis 201.

According to embodiments, first transmissive optical element 222 and second transmissive optical element 224 are displaceable with respect to one another. For example, first transmissive optical element 222 can be displaceable relative to optical axis 201 and second transmissive optical element 224 can be essentially fixed relative to optical axis 201. In other embodiments, such as represented in the example of FIG. 3, second transmissive optical element 224 can be displaceable relative to optical axis 201 and first transmissive optical element 222 can be essentially fixed relative to optical axis 201. In further embodiments, both first transmissive optical element 222 and second transmissive optical element 224 can be displaceable relative to optical axis 201.

By a lateral displacement of, for example, the plane-concave lens, collimated optical measuring beam 13 can be deflected by an angle and a direction, as a result of which the optical measuring beam can be displaced in the processing plane.

Apart from the deflection of the collimated beam, the individual beams also experience a non-uniform refraction. Beams which are refracted more weakly in the focusing lens due to the oblique incidence and which cause the tail or the coma are refracted in the plane-concave lens in such a way that the weaker refraction of the focusing lens is eliminated and the beams meet again in a point in the focal plane (workpiece surface). This leads to a diffraction-limited image. The aberrations of the focusing lens can thus be compensated for by the plane-concave lens. The measuring beam diameter can remain virtually unchanged in the processing plane independently of the deflection (see FIG. 5).

According to embodiments of the present disclosure, the measuring beam can be displaced in its incident position during the laser processing. For example, device 200 can be set up to provide the measuring beam relative to a processing direction 20 of the processing beam on workpiece 1 in front of the processing beam, behind the processing beam, or at the site of the processing beam. Possible measurement positions include for example: Viewed in the advancing direction of the high-energy processing beam, in front of the processing, in the processing region and behind the processing. Furthermore, optical measuring beam 13 can be displaced during the processing transversely or longitudinally with respect to the advancing direction through the point of incidence of the high-energy processing beam. Depth profiles of the vapour capillary occurring during the processing with a high-energy processing beam can thus be prepared.

In some embodiments, device 200 can be set up to measure a distance to a region of workpiece 10 which lies adjacent to the processing region. The region can be an unprocessed surface of workpiece 1. For example, a topography measurement in the approach (e.g. a z-position of the workpiece surface) can be used as a reference measurement and/or for the process management.

Figure 4:
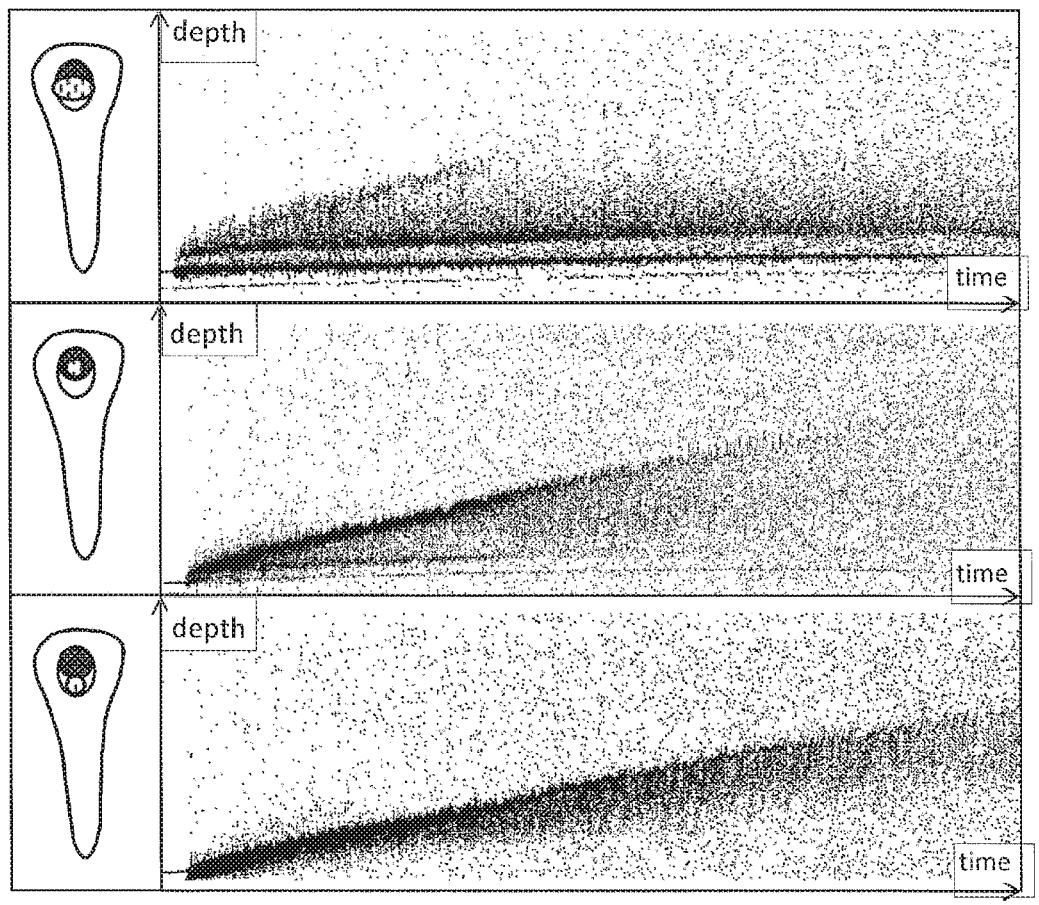
FIG. 4 shows measurement signals of a coherence tomograph.

FIG. 4 shows measurement signals of a coherence tomograph. With increasing time, the energy of the high-energy processing beam is increased, as a result of which the depth of the vapour capillary increases. At the top in FIG. 3, the optical measuring beam exhibits aberrations, as a result of which distance signals from the surface of the workpiece, from the deepest point of the vapour capillary, but also from positions located higher up are obtained. Especially in the case of large depths of the vapour capillary, the coherence tomograph no longer delivers any measurement data from the bottom of the vapour capillary. In the middle of FIG. 3, the optical measuring beam is focused on the workpiece surface without aberrations. However, it does not strike the ideal lateral position, for which reason insufficient distance signals from the bottom of the vapour capillary are detected especially in the case of large welding penetration depths. A measurement at a non-ideal lateral position can occur if the measuring beam cannot be positioned with sufficient precision. At the bottom in FIG. 3, the optical measuring beam is focused on the workpiece surface without aberrations and is located at the ideal position for detecting distance signals from the bottom of the vapour capillary. The depth of the vapour capillary can be measured down to great depths.

Figure 5:
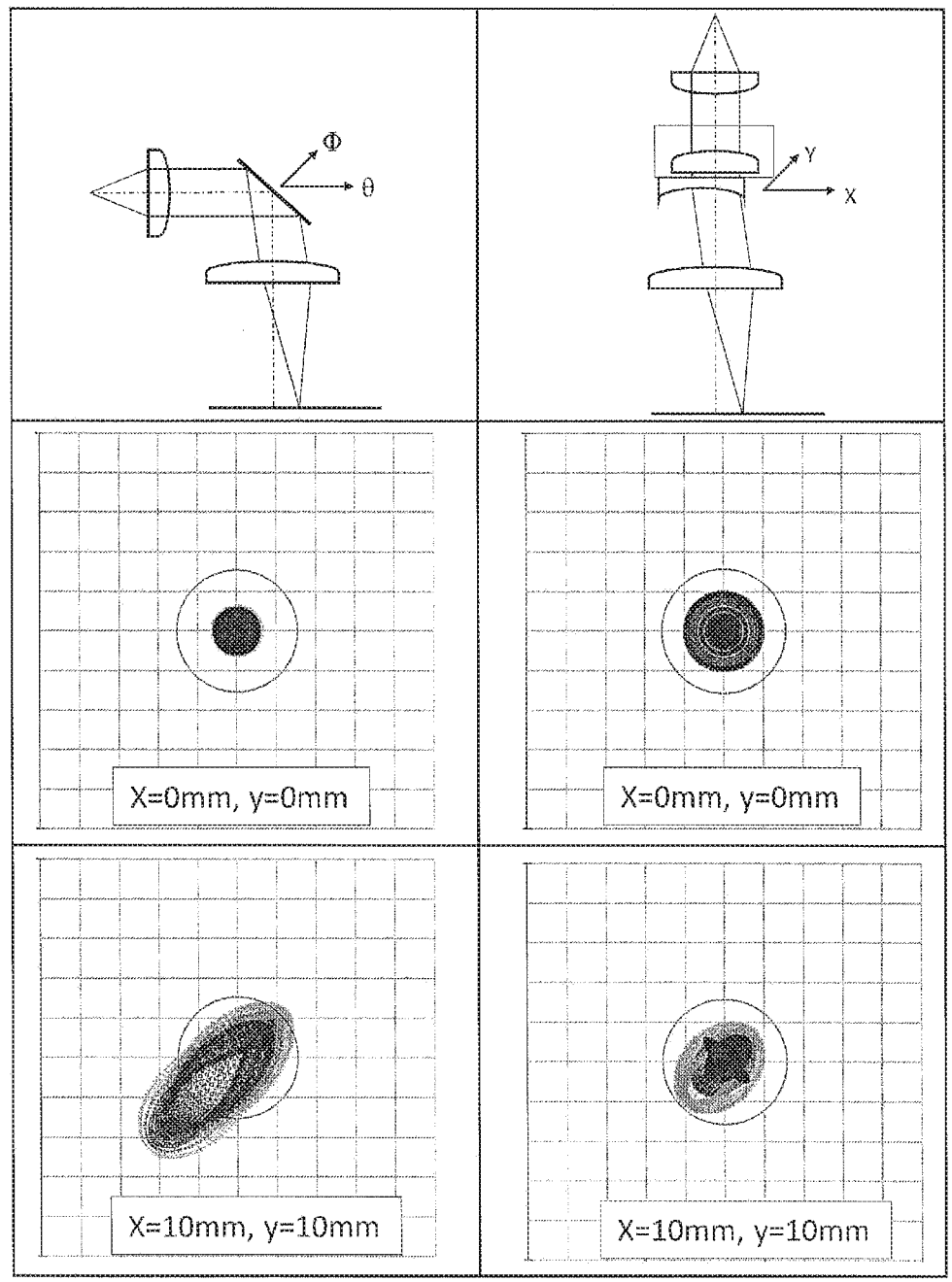
FIG. 5 shows a comparison of the diameters of the measuring beam on the workpiece surface of a conventional deflection device (left-hand side) and of the device according to the invention (right-hand side).

FIG. 5 shows a comparison of the diameters of the optical measuring beam on the workpiece surface of a conventional deflecting device (left-hand side) and the device according to the invention (right-hand side). On the right-hand side, the optical measuring beam exits from a fibre-optic light guide, is collimated and then passes through the inventive transmissive optical elements, which have a lens radius of 200 mm (focal lengths f=400 mm and respectively f=−400 mm). The measuring beam is then focused by a plane-convex lens (focusing lens) with a focal length of f=300 mm.

A diagrammatic representation of a deflection device using mirror optics and using the transmissive optical elements according to the invention for compensating for aberrations and increasing the positional accuracy is shown at the top in FIG. 5. A simulated beam diameter (ray tracing) on the workpiece surface in the centre of the scan field (optical measuring beam runs on the optical axis) is shown in the middle. The circle characterises the refraction limit (theoretically minimum possible diameter of the optical measuring beam with a given image). The two deflection concepts have the same beam diameter on account of the refraction limit. A simulated beam diameter on the workpiece surface with a deflected optical measuring beam is shown at the bottom. In the case of the deflection by mirror optics, the optical measuring beam is no longer reflection-limited and acquires an elliptical shape. In the case of the transmissive optical elements according to the invention for the beam deflection, the optical measuring beam remains refraction-limited despite the beam deflection. The size of the optical measuring beam on the component surface thus remains unchanged in the centre and in the presence of deflection.

The invention claimed is:

1. A device for distance measurement for a laser processing system, comprising:
   a collimator lens system defining an optical axis and configured to collimate an optical beam; and
   a deflection lens system configured to: deflect the collimated optical beam from the optical axis and comprising:
      a first transmissive optical element configured to pass the collimated optical beam, and
      a second transmissive optical element behind the first transmissive optical element in a path of the collimated the beam, wherein at least one of the first and second transmissive optical elements is displaceable relative to the optical axis, wherein one of the first and second transmissive optical elements is a plane-concave lens and the other is a plane-convex lens, and wherein the plane-concave lens has a first radius and the plane-convex lens has a second radius of which an absolute value is identical to an absolute value of the first radius, and
   wherein the deflection lens system is arranged in the beam path in front of a focusing lens system to focus the deflected optical beam onto a workpiece.

2. The device according to claim 1, wherein the optical beam is an optical measuring beam.

3. The device according to claim 1, wherein the optical beam is a processing beam of the laser processing system and the device further comprises a light source for irradiating an optical measuring beam, which can be focused by the focusing lens system onto the workpiece.

4. The device according to claim 1, wherein at least one of the first and second transmissive optical elements is displaceable relative to the optical axis in a direction perpendicular to the optical axis.

5. The device according to claim 1, wherein the deflection lens system further comprises a spherical lens or an aspherical lens.

6. The device according to claim 1, wherein the first transmissive optical element and the second transmissive optical element are displaceable relative to one another.

7. The device according to claim 1, wherein the first transmissive optical element is displaceable relative to the optical axis and the second transmissive optical element is essentially fixed relative to the optical axis, or wherein the second transmissive optical element is displaceable relative to the optical axis and the first transmissive optical element is essentially fixed relative to the optical axis, or wherein the first transmissive optical element and the second transmissive optical element are displaceable relative to the optical axis.

8. The device according to claim 1, wherein the deflection lens system is configured to compensate for aberrations of the optical beam on the workpiece.

9. The device according to claim 1, further comprising a coherence interferometer.

10. A laser processing system, comprising:
   a laser device configured to generate and direct a processing beam onto a processing region of a workpiece; and
   a device for distance measurement for a laser processing system, comprising:
      a collimator lens system defining an optical axis and configured to collimate an optical beam; and
      a deflection lens system configured to deflect the collimated optical beam from the optical axis and comprising:
         a first transmissive optical element configured to pass the collimated optical beam, and
         a second transmissive optical element behind the first transmissive optical element in a path of the collimated the beam, wherein at least one of the first and second transmissive optical elements is displaceable relative to the optical axis, wherein one of the first and second transmissive optical elements is a plane-concave lens and the other is a plane-convex lens, and wherein the plane-concave lens has a first radius and the plane-convex lens has a second radius of which an absolute value is identical to an absolute value of the first radius, and
      wherein the deflection lens system is arranged in a path of the collimated beam in front of a focusing lens system to focus the deflected optical beam onto the workpiece.

11. The laser processing system according to claim 10, wherein the processing beam and the optical measuring beam are at least partially superimposed coaxially.

12. The laser processing system according to claim 10, wherein the device is configured to provide the optical measuring beam, with respect to a processing direction of the processing beam on the workpiece, in front of the processing beam, after the processing beam, or at a site of the processing beam.

13. A method for distance measurement for a laser processing system, comprising:
   collimating a beam;
   deflecting the collimated optical beam by displacing at least one of a first transmissive optical element and a second transmissive optical element behind the first transmissive optical element in a path of the collimated beam, wherein at least one of the first and second transmissive optical elements is displaceable relative to the optical axis, wherein one of the first and second transmissive optical elements is a plane-concave lens and the other is a plane-convex lens, and wherein the plane-concave lens has a first radius and the plane-convex lens has a second radius of which an absolute value is identical to an absolute value of the first radius; and
   focusing of the deflected optical beam onto a workpiece.

14. The method according to claim 13, further comprising determining a depth or a depth profile of a vapour capillary on the workpiece or a topography of the workpiece using a measuring beam reflected from the workpiece.

15. The device according to claim 1, wherein a diameter of the optical beam before passing the first transmissive optical element in the beam path is substantially the same as a diameter of the optical beam after passing the second transmissive optical element in the beam path.

16. The device according to claim 1, wherein a plane surface of the plane-concave lens and a plane surface of the plane-convex lens face one another and are adjacent to each other.

* * * * *